United States Patent [19]
Hickl et al.

[11] Patent Number: 5,416,300
[45] Date of Patent: May 16, 1995

[54] ELECTRIC IGNITER ACTUATOR WITH NETWORK VOLTAGE CLOCKING TO PASS ONLY A PORTION OF THE WAVE TRAINS TO THE IGNITER

[75] Inventors: Erich Hickl, Malsch; Jurgen Hoffmann, Rastatt; Josef Lelle, Baden-Baden, all of Germany

[73] Assignee: Landis & Gyr Business Support AG, Zug, Switzerland

[21] Appl. No.: 201,618

[22] Filed: Feb. 25, 1994

[30] Foreign Application Priority Data

Mar. 5, 1993 [CH] Switzerland .................. 664/93

[51] Int. Cl.6 ............................................ H05B 1/02
[52] U.S. Cl. .................... 219/262; 219/492; 219/488; 361/264
[58] Field of Search .................... 219/260–270, 219/552, 492, 494, 488; 361/264, 265, 266; 307/231, 260, 264, 296.1, 296.3; 431/256, 254, 255, 257, 258, 43

[56] References Cited

U.S. PATENT DOCUMENTS

| | | | |
|---|---|---|---|
| 4,023,004 | 5/1977 | Burke | 219/718 |
| 4,099,906 | 7/1978 | Pinckaers . | |
| 4,265,612 | 5/1981 | Romanelli et al. | 431/256 |
| 4,560,343 | 12/1985 | Bohan, Jr. . | |
| 4,604,517 | 8/1986 | Barry | 219/494 |
| 4,643,668 | 2/1987 | Geary . | |
| 4,711,628 | 12/1987 | Geary . | |
| 4,746,284 | 5/1988 | Geary . | |
| 4,755,132 | 7/1988 | Geary . | |
| 4,809,128 | 2/1989 | Geary | 361/264 |
| 4,856,983 | 8/1989 | Geary . | |
| 4,935,606 | 6/1990 | Geary | 219/492 |
| 5,003,161 | 3/1991 | Geary | 219/492 |
| 5,079,410 | 1/1992 | Payne et al. | 219/492 |
| 5,133,656 | 7/1992 | Peterson . | |
| 5,249,096 | 9/1993 | Williams | 361/264 |

FOREIGN PATENT DOCUMENTS

| | | | |
|---|---|---|---|
| 0482856 | 4/1992 | European Pat. Off. . | |
| 2605533 | 8/1977 | Germany | 219/492 |
| 9014562 | 11/1990 | WIPO . | |

OTHER PUBLICATIONS

Mitchell, K., "Pulsed Current Heating Circuit", *Electronic Engineering* v. 54, No. 666, Jun. 1982.

*Primary Examiner*—John A. Jeffery
*Attorney, Agent, or Firm*—Meltzer, Lippe, Goldstein, Wolf, Schlissel & Sazer

[57] ABSTRACT

An automatic furnace comprises an actuator for an electric igniter. The electric igniter has a distinctly lower standard voltage, e.g., 120 V, than the network voltage, e.g., 230 V and is operated by the network voltage. The network voltage is fed into the power regulator before the igniter. The power regulator clocks the network voltage with an adjustable keying ratio, so that only part of the full wave trains of the network voltage becomes active at the electric igniter. In an advantageous embodiment, the keying ratio is variegated by the actual level of the network voltage.

14 Claims, 2 Drawing Sheets

ELECTRIC IGNITER ACTUATOR WITH NETWORK VOLTAGE CLOCKING TO PASS ONLY A PORTION OF THE WAVE TRAINS TO THE IGNITER

FIELD OF THE INVENTION

The instant invention relates to an automatic furnace having an electric igniter which can be heated by network voltage.

BACKGROUND OF THE INVENTION

Automatic furnaces of this type are suitable, for instance, to control the start-up process of a burner which produces heat in a heating system. Gas is used as the fuel in such a system.

An automatic furnace of this type is known from U.S. Pat. No. 4,099,906, in which the ignition element used for the gas/air mixture is an electric igniter known as a "hot surface igniter". Such electric igniters have been used for years in countries with a 120 Volt a.c. power network and are obtainable on the market. However, the production of such electric igniters for 230 Volt operation is prevented by the properties of the materials, e.g., silicon carbide, used in such electric igniters. For this reason such electric igniters are not yet available.

Several possibilities exist for the utilization of a 120 volt igniter in a 230 Volt network. First, there is the possibility of using a transformer in order to convert the 230 V voltage to 120 V. In view of the necessary power output of approximately 400 Watt, such a transformer would be of such a size that it could not fit into a conventional housing of an automatic furnace. Because of the space availability on a burner, the automatic furnace housing cannot be enlarged. Furthermore, such a transformer would represent a considerable cost factor.

The utilization of phase control by means of thyristors offers an alternative solution. This solution is also disadvantageous in that it necessitates considerable expense for interference suppression means in order to attenuate the radio interferences, which invariably occur in such circuits, to a level in conformity with legal provisions. In view of the high performance necessary, these interference suppression means also take up much space.

SUMMARY OF THE INVENTION

It is an object of the instant invention to create an automatic furnace in which it is possible to trigger an electric igniter of the type mentioned above without the disadvantages.

This object and others are accomplished by the present invention by providing an actuator for an electric igniter in an automatic furnace, which electric igniter is heated by network voltage, comprising a source of network voltage, a power regulator connected between the source of network voltage and said electric igniter for clocking the network voltage with an adjustable keying ratio so that only part of full wave trains of the network voltage become active at the electric igniter.

Another embodiment of the invention further provides an actuator for an electric igniter designed for 120 V operation, a network voltage of approximately 230 V and a keying ratio of 1:4. The power regulator can allow one full wave train of the network voltage to pass, then locks three full wave trains of the network voltage, thereby obtaining the keying ratio 1:4.

A further embodiment of the invention provides a power regulator having first input for receiving a signal corresponding to a rated standard voltage for operation of the electric igniter and a second input for receiving a signal corresponding to the network voltage, the keying ratio changes as a function of a ratio between the rated standard voltage and the network voltage, and converted stray power at the electric igniter remains substantially constant.

Still another embodiment of the present invention includes a power regulator comprising a first operational amplifier having a non-inverting input, an inverting input and an output, a first capacitor connected to the non-inverting input of the first operational amplifier, whereby the non-inverting input is acted upon by a charging state of the capacitor, and the output of the first operational amplifier, a voltage divider connected to the inverting input of the first operational amplifier, a second operational amplifier for controlling production of ignition impulses having at least an output, a non-inverting input and an inverting input, the inverting input being acted upon by the output of the first operational amplifier, and a triac for receiving the ignition pulses from the output of said second operational amplifier after a crossover of the network voltage $U_{act}$ at beginning of a positive half-wave of the network voltage $U_{act}$.

BRIEF DESCRIPTION OF THE DRAWINGS

Examples of embodiments of the invention are explained in further detail below with reference to the following drawings.

DETAILED DESCRIPTION OF THE INVENTION

Figure 1:
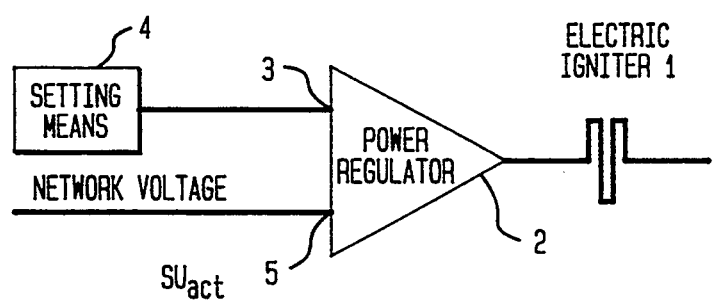
FIG. 1 shows a schematic diagram of a triggering circuit for an electric igniter.

A known electric igniter, commonly known in the field as a "hot surface igniter (HSI)", is designated by 1 in FIG. 1. The electric igniter 1 is supplied with current and voltage by a power regulator 2. This power regulator 2 has a first input 3 which is connected to a setting means 4. A signal $S_{Uact}$ represents the actual level of the supply voltage $U_{act}$ of an automatic furnace. This signal is sent to the power regulator 2 through a second input 5. The signal $S_{Uact}$ represents the voltage at that moment, i.e., the prevailing actual value which may fluctuate within certain limits.

The setting means 4 emits a signal representing a desired value of a network voltage of 120 V.

The power regulator 2 compares the signals appearing at its inputs 3 and 5 and produces an output signal, which consists of individual packages of sine waves of an a.c. voltage. The output signal has a keying ratio TV such that the power output converted at the electric igniter 1 which is operated at a prevailing voltage $U_{act}$ has approximately the same magnitude as the power output converted at the electric igniter 1 when it is operated with a standard voltage of 120 V. Accordingly, the keying ratio TV is varied as a function of the voltage $U_{act}$. The current path is, thereby, switched on and off in a known manner and always at the moment of zero passage so that no interfering impulses are produced.

If the voltage $U_{act}$ is 230 V, the keying ratio TV assumes the value 1:4, meaning that only one fourth of all sine oscillations or waves, e.g., every fourth full sine oscillation of the voltage, reaches the electric igniter 1. Thus, the power output converted at the electric igniter 1 is approximately the same as the power output when the electric igniter 1 is operated with 120 V. If the voltage $U_{act}$ is only 210 V, the keying ratio TV assumes the value 1:3, so that only one third of all sine oscillations, e.g., every third full sine oscillation of the voltage, reaches the electric igniter 1. With a voltage of 210 V and a keying ratio TV of 1:3, the power output converted at the electric igniter 1 is again approximately the same as the power output when the igniter is operated at 120 V.

In the simplest form of the invention, the power regulator 2 can be realized without the comparison of actual and reference voltage values and can be permanently adjusted so that it supplies the electric igniter with a keying ratio TV of 1:4 from the standard voltage. In this case, it lets only every fourth sine wave train of the standard voltage through to the electric igniter 1, i.e., it locks or suppresses three out of four wave trains. Such a simplified solution can always be used if the automatic furnace is designed so that when greater fluctuations of the distribution voltage occur, it is shut off by an undervoltage and an overvoltage switch.

Figure 2:
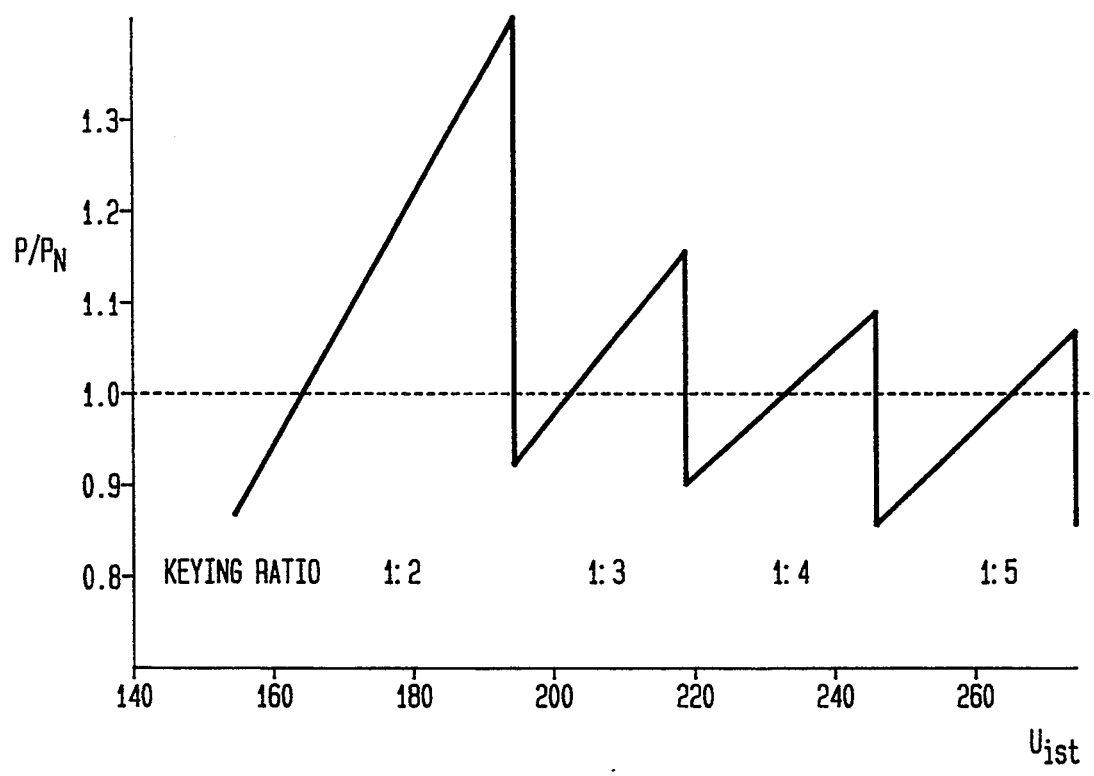
FIG. 2 shows a diagram of the capacity transferred to the electric igniter as a function of the utility voltage, FIG. 3 schematically shows a preferred embodiment of the invention, and FIG. 4 schematically shows a source of d.c. voltage to be used in combination with the preferred embodiment of FIG. 3.

FIG. 2 shows the relative output ratio $P/P_N$ of the power output converted at the electric igniter 1 as a function of the magnitude of the voltage $U_{act}$. The power output ratio $P/P_N$ is given by the formula:

$$P/P_N = \frac{U_v^2}{U_{act}^2/TP + 1}$$

where $U_v$ is the value of the standard network voltage of the electric igniter 1, i.e., 120 V, and TP is the number of suppressed sine oscillations or waves between two transmitted full sine oscillations. Here the value TP is identical to the reciprocal value of the keying ratio TV minus 1.

The keying ratio is varied or altered by the power regulator 2 as a function of the voltage $U_{act}$. If the electric igniter 1 is designed, as mentioned above, for a network voltage of 120 V, the keying ratio TV is calculated according to the following formula:

$$TV = \frac{1}{\text{INT}\left[\left(\frac{U_{act}}{120}\right)^2 + 0.5\right]}$$

Such a stabilization of the power output converted at the electric igniter 1 is advantageous because the heating time of the electric igniter 1, which is considerable within the framework of start-up procedure, remains nearly constant even with great changes in voltage. The annealing temperature reached is then subject only to oscillations which are still within the tolerance.

Figure 3:
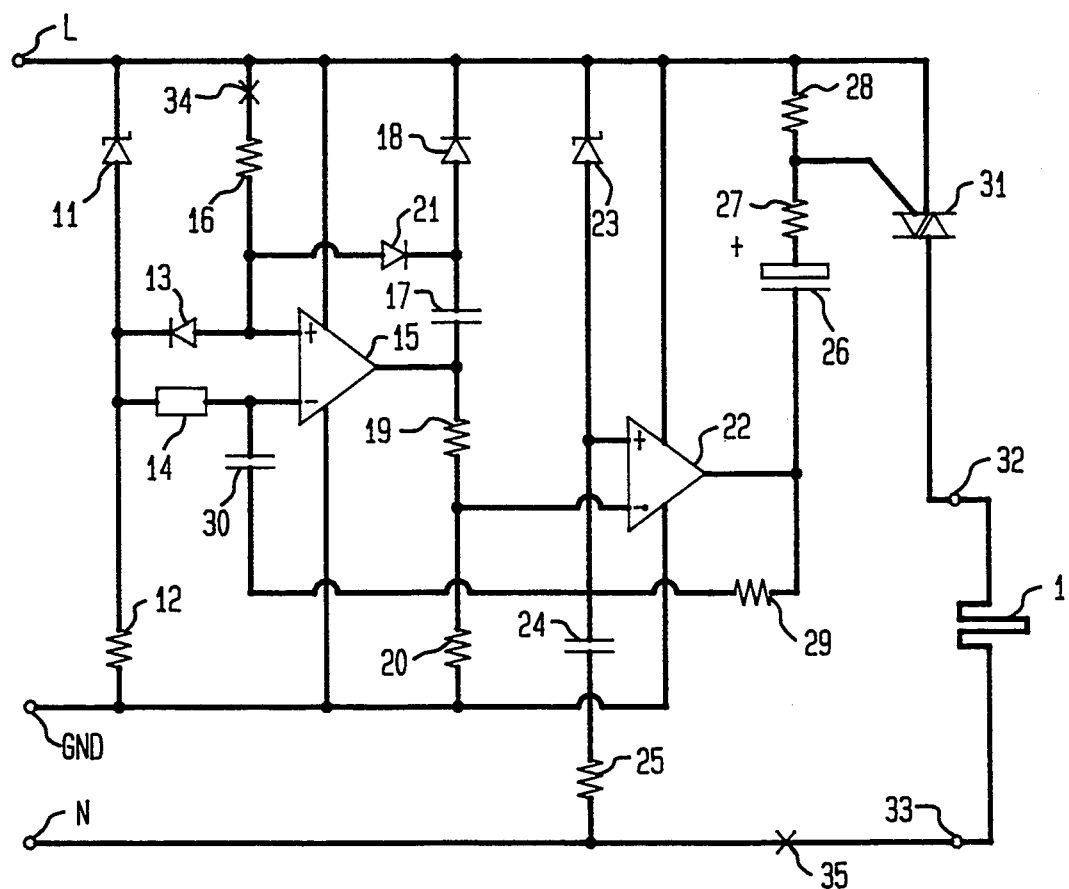

FIG. 3 shows a preferred embodiment of the power regulator 2 which also contains a setting means 4. L designates the phase connection of the network voltage, N designates the neutral wire of the network voltage and GND designates reference ground. A source of direct current, which is not shown here, is connected by its positive pole to the phase connection L. Its negative pole constitutes the reference ground GND. The cathode side of a first Zener diode 11 is connected to the phase connection L. The anode side of Zener diode 11 is connected on one side via a first resistor 12 to the reference ground GND and on the other side to the cathode connection of a first diode 13 and a second resistor 14. Resistor 14 is also connected to the inverting input of a first operational amplifier ("Op-amp") 15. The anode connection of diode 13 is connected to the non-inverting input of the operational amplifier 15. The non-inverting input of op-amp 15 is also connected via a third resistor 16 to the phase connection L. The output of the operational amplifier 15 is connected, on the one hand, via a first capacitor 17 and a second diode 18 to the phase connection L, and, on the other hand, via two additional resistors 19, 20, connected one behind the other, to the reference ground GND. The diode 18 is connected by its cathode connection to the phase connection L. An additional diode 21 is located between the non-inverting input of the operational amplifier 15 and the connection of diode 18. Therefore, the anode of diode 21 is connected to the non-inverting input of the operational amplifier 15.

The connection point of the resistors 19 and 20 is connected to the inverting input of a second operational amplifier 22. The non-inverting input of the second operational amplifier 22 is connected, on the one hand, via a second Zener diode 23 to the phase connection L, and, on the other hand, via a second capacitor 24 and an additional resistor 25 to the neutral wire N. The zener diode 23 is connected by its cathode to phase connection L.

The output of the operational amplifier 22 is connected to a capacitor 26. The second connection of capacitor 26 is connected to a series circuit of two additional resistors 27 and 28. Furthermore, the output of the operational amplifier 22 is connected back, via an additional resistor 29 and an additional capacitor 30, to the inverting input of the operational amplifier 15.

The connection point of the resistor 27 and 28 is connected to the control connection or gate of a triac 31. One anode or main terminal of the triac 31 is connected to the phase connection L, while the second anode or main terminal is connected to a first connection point 32 to which the electric igniter 1 can be connected. The electric igniter 1 can also be connected to a second connection point 33 which is connected to the neutral wire N.

It is an essential feature that the two operational amplifiers 15 and 22 have push-pull outputs.

The usual elements of an automatic furnace, although essential for the operation of the automatic furnace, nevertheless have no bearing on the function of triggering the electric igniter 1 and are not shown in the drawings. For the sake of completeness it should be mentioned, however, that a switching element actuated by a flame signal amplifier may be present at a location 34 between the resistor 16 and the phase connection L. It is, also, possible to provide contacts of a safety chain at a location 35, between the neutral wire N and the connection point 33.

The essential points of the operation of the above-described circuitry are now described below. The capacitor 17 is charged via resistor 16 because, at the same time, the output of operational amplifier 15 is on LOW and, therefore, carries ground voltage so that the resistors 19 and 20 are out of action. As long as the voltage at the capacitor 17 is less than a representative reference value of the voltage divider, which is formed by the Zener diode 11 and the resistor 12, the output of the operational amplifier 15 remains on LOW and the charging of the capacitor 17 continues. During this time, the triac 31 is locked or closed. As soon as the voltage at the capacitor 17 exceeds the reference value formed by the voltage divider 11, 12, the output of the operational amplifier 15 switches to HIGH. The inverting input of the operational amplifier 22, thereby, also switches to HIGH. The non-inverting input of the operational amplifier 22 is at first also on HIGH voltage. However, with the next positive half-wave, the threshold of HIGH voltage is not attained because of the voltage drop across the Zener diode 23. Consequently, the output of the operational amplifier 22 switches to LOW. An igniting impulse is thereby produced for the triac 31 via resistors 28 and 27, so that it ignites and the electric igniter 1 receives current.

As soon as the positive half-wave changes over to negative, the voltage again goes over the HIGH threshold at the non-inverting input of the operational amplifier 22. Thereby causing the output of the operational amplifier 22 to also go back to HIGH and the discharging current of the capacitor 26 to produce an igniting impulse at the triac 31 for the negative half-wave in interaction with the resistors 27 and 28. At the same time, the inverting input of the operational amplifier 15 is changed to HIGH by the resistor 29 and capacitor 30. As a result, the output of the operational amplifier 15 switches to LOW and the charging of the capacitor 17 starts anew.

It is obvious, that the voltage divider formed by the Zener diode 11 and the resistor 12 determines the switching threshold, so that this voltage divider corresponds in function to the setting means 4, as shown in FIG. 1.

The charging time of the capacitor 17 determines the locking time of the triac 31. It is a determining factor for the operation that the d.c. voltage source is not stabilized so that the level of its voltage is a function of the network voltage. For example, if the network voltage is 230 V, the d.c. voltage source yields 20 V. If the network voltage is higher, the voltage of the d.c. voltage source is also higher. Inversely, if the network voltage is less than 230 V, the voltage of the d.c. voltage source is less than 20 V.

On the other hand, it must be ensured that the ignition of the triac 31 can occur only at the beginning of a half-wave. This is achieved by means of the RC link formed by the resistor 25 and the capacitor 24 in combination with the Zener diode 23. The Zener diode 23 determines the level at the non-inverting input of the operational amplifier 22 and prevents the generation of ignition impulses for the triac 31 when the voltage within a half-wave has already exceeded a certain level, therefore, the ignition of the triac can occur only with the next positive half-wave.

The voltage dropping off at the resistor 12 is, thus, also a function of the level of the network voltage. If the Zener diode 11 has, for example, a Zener voltage of 12 V, and the network voltage is 230 V which corresponds to a d.c. voltage of 20 V, approximately 8 V are dropped off. This voltage drop fluctuates with the network voltage. Because the switching state of the operational amplifier 15 is determined, on the one hand, by the voltage drop at the resistor 12 and, on the other hand, by the level of charging voltage of capacitor 17, the length of the charging process of capacitor 17 is a determining factor for the switching state of the operational amplifier 15. If the network voltage is lower, the voltage drop at resistor 12 is consequently smaller, thereby, lowering the threshold for switch-over of the operational amplifier 15. As a result, the switch-over of the operational amplifier from LOW to HIGH occurred already with a lower voltage at the capacitor 17, i.e., at an earlier point in time. With a network voltage of 230 V, the charging voltage at the capacitor 17 leading to the switch-over of the operational amplifier 15 reaches the required level only at a point in time when the third wave train in a row of the network voltage is active, while the triac 31 was locked. At the beginning of the following fourth wave train, the ignition of the triac 31 takes place so that it is conductive and the electric igniter 1 receives current during the fourth wave train. In this manner a keying ratio TV of 1:4 is attained.

With a network voltage of only 210 V, the charging voltage at the capacitor 17, resulting in the switch-over of the operational amplifier 15, reaches the necessary level at a point in time when the second wave train in a row of the network voltage is active, while the triac 31 is locked. At the beginning of the following third wave train, the ignition of the triac takes place so that it is conductive during the third wave train and the electric igniter 1 receives current. In this manner a keying ratio TV ratio of 1:3 is attained.

The model to be used for the operational amplifiers 15, 22 is as important for the functioning of the described circuit, as is the sizing of the other components. Therefore, the following list of components is given:

| | |
|---|---|
| Zener diode 11: | BZX55C - 12 V |
| Resistor 12: | 3.3 Kohm |
| Diode 13: | 1N4148 |
| Resistor 14: | 33 Kohm |
| Operational amplifier 15: | ½ LM 358 N |
| Resistor 16: | 3.3 MOhm |
| Capacitor 17: | 68 nF |
| Diode 18: | 1N4148 |
| Resistor 19: | 15 Kohm |
| Resistor 20: | 100 Kohm |
| Diode 21: | 1N4148 |
| Operational amplifier 22: | ½ LM 358N |
| Zener diode 23: | BZX55C - 7.5 V |
| Capacitor 24 | 68 Nf |
| Resistor 25: | 1 Mohm |
| Capacitor 26: | 2.2 μF |
| Resistor 27: | 680 Ohm |
| Resistor 28: | 1 Kohm |
| Capacitor 30: | 10 Nf |
| Triac 31: | TO 809 NH |

The circuit made using these components provides output control as shown in FIG. 2.

A switch actuated by a flame signal amplifier and located at location 34, is opened at the moment when the flame signal appears so that the capacitor 17 can no longer be charged. The switch may be a transistor. Consequently, the electric igniter 1 is not heated up.

The solutions described above have keying ratios TV of 1:n which are characterized by the fact that of n wave trains in a row only one can act upon the electric igniter 1, while n−1 wave trains in a row remain locked or suppressed. It would also be possible, without going outside the framework of the invention, to provide a wave train package control of a kind that would allow i wave trains to go through and i-(N−1) wave trains to be locked.

Figure 4:
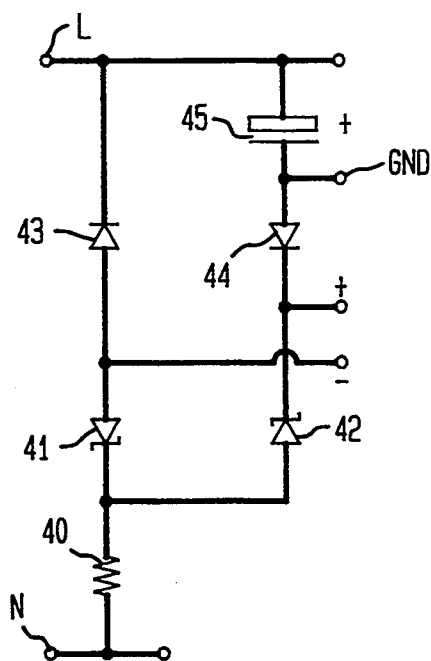

FIG. 4 shows a schematic diagram of the d.c. voltage source for use in combination with the above-mentioned embodiment. In this embodiment the voltage produced is tied directly to the applicable network voltage, so that the level of the d.c. voltage is at the same time a measure for the level of the network voltage. The desired value of the network voltage is decisive in determining the correct ratio TV.

A pre-resistor 40 is connected to the neutral wire N. At its second connection point, the resistor 40 is connected to the cathode of a Zener diode 41 and to the anode of a Zener diode 42. The anode of the zener diode 41 is connected to the anode of a diode 43 whose cathode is connected to the phase connection L. The cathode of the Zener diode 42 is connected to the cathode of a diode 44. The anode of diode 44 is connected a capacitor 45. The capacitor 45 is connected by its second connection to the phase connection L. The anode connection of the diode 44 represents the reference grounding GND. A voltage, which depends on the level of the network voltage prevailing between the phase connection L and the neutral wire N, builds up over capacitor 45. The connection point between the anode of the zener diode 41 and the diode 43 also represents the negative pole of an additional d.c. voltage source. The additional d.c. voltage source can be used to supply other elements of the automatic furnace, e.g., the relays and their actuation. The positive pole of this additional d.c. voltage source is constituted by the cathode connection of the Zener diode 42.

The Zener diodes 41 and 42 may be model BZX84C - 24 V and the diodes 43 and 44 maybe model 1N4007. The capacitor 45 has a capacitance of 100 μF.

The automatic furnace according to the invention makes it possible to utilize electric igniters designed for 120 V operation with higher network voltages, e.g. 230 V. The direct operation of such an electric igniter 1 on this type of network is advantageous because the electric igniter 1 can simultaneously be used as a sensor electrode of an ionization sensor for flame monitoring.

With a power regulator 2, according to the above-described embodiment, only keying ratio TV whose reciprocal value is an integer can be realized. However, when using a circuit with a full-wave impulse package control of the ordinary type, it is also possible to achieve keying ratios TV whose reciprocal value is not an integer. If for instance, two full waves are let through by the power regulator 2 and the subsequent seven full waves are locked, a keying ratio TV of 1:3.5 results. An even better adaptation of power output can be achieved in this manner.

We claim:

1. In an automatic furnace comprising an electric igniter in which the electric igniter is heated by a source of network voltage applied thereto, the improvement comprising an actuator, said actuator comprising
a power regulator connected between said source of network voltage and said electric igniter for clocking the network voltage with an adjustable keying ratio thereby allowing one full wave train of said network voltage to pass and locking out two, three or four full wave trains.

2. The actuator of claim 1, wherein said electric igniter is designed for 120 V operation, said network voltage is approximately 230 V and said keying ratio of said power regulator is 1:4.

3. The actuator of claim 2, wherein said power regulator allows one full wave train of said network voltage to pass, then locks three full wave trains of said network voltage and obtains said keying ratio 1:4.

4. The actuator of claim 1, wherein said power regulator further comprises a first inputs for receiving a signal corresponding to a rated standard voltage for operation of said electric igniter and a second input for receiving a signal corresponding to said network voltage, said keying ratio changes as a function of a ratio between said rated standard voltage and said network voltage, and converted stray power at the electric igniter remains substantially constant.

5. The actuator of claim 4, wherein said power regulator determines said keying ratio TV according to $$TV = \frac{1}{\text{INT}\left[\left(\frac{U_{act}}{120}\right)^2 + 0.5\right]}$$

where $U_{act}$ is actual value of said network voltage.

6. The actuator of claim 5, wherein said power regulator further comprises
a first operational amplifier having a non-inverting input, an inverting input and an output,
a first capacitor connected to said non-inverting input of said first operational amplifier, whereby said non-inverting input is acted upon by a charging state of said capacitor, and to said output of said first operational amplifier,
a voltage divider connected to said inverting input of said first operational amplifier,
a second operational amplifier for controlling production of ignition impulses having at least an output, a non-inverting input and an inverting input, said inverting input being acted upon by said output of said first operational amplifier, and
a triac for receiving said ignition pulses from said output of said second operational amplifier after a crossover of said network voltage $U_{act}$ at beginning of a positive half-wave of said network voltage $U_{act}$.

7. The actuator of claim 6, wherein said charging state is a function of said network voltage.

8. The actuator of claim 7, wherein said voltage divider further comprises,
a zener diode having an anode and a cathode, and
a resistor connected to said anode of said zener diode, wherein said inverting input of said first operational amplifier is connected between said zener diode and said resistor.

9. The actuator of claim 8, wherein said operational amplifiers have push-pull outputs.

10. The actuator of claim 9 wherein said power regulator further comprises a non-stabilized d.c. voltage for operating said operational amplifiers and said voltage divider, and having a magnitude as a function of said network voltage.

11. The actuator of claim 8, wherein said power regulator further comprises a non-stabilized d.c. voltage for operating said operational amplifiers and said voltage divider, and having a magnitude as a function of said network voltage.

12. The actuator of claim 6, wherein said operational amplifiers have push-pull outputs.

13. The actuator of claim 12, wherein said power regulator further comprises a non-stabilized d.c. voltage for operating said operational amplifiers and said voltage divider, and having a magnitude as a function of said network voltage.

14. The actuator of claim 6, wherein said power regulator further comprises a non-stabilized d.c. voltage for operating said operational amplifiers and said voltage divider, and having a magnitude as a function of said network voltage.

* * * * *